United States Patent
Yu (10) Patent No.: US 8,469,325 B2
(45) Date of Patent: Jun. 25, 2013

(54) MUSICAL INSTRUMENT STAND WITH AN ANGLE ADJUSTMENT FUNCTION

(76) Inventor: Tsung-Yao Yu, Daya Township, Taichung County (TW)

( * ) Notice: Subject to any disclaimer, the term of this patent is extended or adjusted under 35 U.S.C. 154(b) by 96 days.

(21) Appl. No.: 13/281,488

(22) Filed: Oct. 26, 2011

(65) Prior Publication Data

US 2013/0105644 A1 May 2, 2013

(51) Int. Cl.
*A47G 1/10* (2006.01)

(52) U.S. Cl.
USPC ............ 248/316.1; 248/451; 248/288.31; 248/231.51

(58) Field of Classification Search
USPC ............ 248/125.7, 441.1, 447.2, 448, 451, 248/26.11, 230.1, 229.13, 229.23, 230.4, 248/231.51, 288.31, 288.51, 181.1, 316.1, 248/316.4; 359/802
See application file for complete search history.

(56) References Cited

U.S. PATENT DOCUMENTS

| | | | | |
|---|---|---|---|---|
| 1,547,065 A * | 7/1925 | Noble | ............. | 248/229.13 |
| 5,187,744 A * | 2/1993 | Richter | ............. | 379/449 |
| 5,769,369 A * | 6/1998 | Meinel | ............. | 248/176.1 |
| 7,661,648 B2 * | 2/2010 | Lin | ............. | 248/683 |
| 7,669,816 B2 * | 3/2010 | Crain et al. | ............. | 248/183.3 |
| 2006/0290654 A1 * | 12/2006 | Wang | ............. | 345/156 |
| 2007/0090238 A1 * | 4/2007 | Justis | ............. | 248/181.1 |
| 2008/0296449 A1 * | 12/2008 | Carnevali | ............. | 248/205.1 |

* cited by examiner

*Primary Examiner* — Anita M King
(74) *Attorney, Agent, or Firm* — Alan Kamrath; Kamrath IP Lawfirm, P.A.

(57) ABSTRACT

A musical instrument stand includes a clamping unit and a support unit connected with the clamping unit. The support unit includes a base frame and a connecting module. The connecting module includes a connecting portion and a spherical universal connector. The clamping unit includes a clamp assembly, a spherical mounting seat, and a positioning nut. The mounting seat has an external thread onto which the positioning nut is screwed onto and has a periphery provided with at least two elongate slits. Thus, the mounting seat of the clamping unit is pivotally connected with the universal connector of the support unit so that the support unit can be pivoted relative to the clamping unit so as to adjust the angle of the support unit freely and variably.

9 Claims, 11 Drawing Sheets

MUSICAL INSTRUMENT STAND WITH AN ANGLE ADJUSTMENT FUNCTION

BACKGROUND OF THE INVENTION

1. Field of the Invention

The present invention relates to a stand and, more particularly, to a musical instrument stand for supporting a musical instrument, a music notation, and the like.

2. Description of the Related Art

A conventional musical instrument stand comprises an upright tube, a clamping device adjustably mounted on the upright tube, and a holder mounted on the clamping device to move in concert with the clamping device. The holder can be used to support an object, such as a music notation, a musical instrument, and the like. Thus, when the clamping device is unlocked, the clamping device is moved on the upright tube upward and downward to move and adjust the height of the holder. However, the angle of the holder cannot be adjusted freely according to the user's requirement, thereby causing inconvenience to the user when wishing to adjust the angle of the holder.

BRIEF SUMMARY OF THE INVENTION

In accordance with the present invention, there is provided a musical instrument stand, comprising a clamping unit and a support unit connected with the clamping unit. The support unit includes a telescopically arranged base frame, and a connecting module mounted on a face of the base frame. The connecting module of the support unit is connected with the clamping unit. The connecting module of the support unit includes a connecting portion having a first end connected with the base frame, and a spherical universal connector integrally formed on a second end of the connecting portion. The clamping unit includes a clamp assembly, a spherical mounting seat connected with the clamp assembly and pivotally connected with the universal connector of the connecting module, and a positioning nut screwed onto the mounting seat. The mounting seat has a first end connected with the clamp assembly and a second end provided with an external thread onto which the positioning nut is screwed onto. The second end of the mounting seat has a periphery provided with at least two elongate slits. When the support unit and the clamping unit are disposed at an unlocked state, the base frame of the support unit is detached from the clamp assembly of the clamping unit, and the positioning nut of the clamping unit is mounted on the connecting portion of the connecting module. When the support unit and the clamping unit are disposed at a locked state, the mounting seat of the clamping unit is mounted on the universal connector of the support unit, and the positioning nut of the clamping unit is screwed onto the external thread of the mounting seat to compress the slits of the mounting seat and to contract the mounting seat so that the mounting seat compresses the universal connector closely.

The universal connector of the connecting module has a surface provided with a limit groove. The positioning nut has an inner wall provided with a limit piece limited in the limit groove of the universal connector. The connecting module of the support unit further includes two opposite antiskid blocks mounted on the universal connector. The universal connector of the connecting module has two opposite sides each provided with a mounting recess for mounting each of the two antiskid blocks.

The clamp assembly includes a lower clamp connected with the mounting seat, and an upper clamp connected with and movable relative to the lower clamp. The upper clamp has a surface provided with a receiving space. The clamping unit further includes a clamping space defined between the lower clamp and the upper clamp, an upper pressing block mounted on the receiving space of the upper clamp, a threaded rod having a lower end secured on the lower clamp and an upper end extending through the upper clamp and the upper pressing block, and a locking nut screwed onto the upper end of the threaded rod and pressing the upper pressing block. The clamp assembly further includes a bushing removably mounted in the lower clamp and disposed between the lower clamp and the upper clamp. The clamping space of the clamping unit is defined between the bushing and the upper clamp. The clamp assembly further includes two antiskid members mounted in the upper clamp and the bushing respectively.

The clamp assembly includes a lower clamp connected with the mounting seat, and an upper clamp connected with and movable relative to the lower clamp. The upper clamp has a surface provided with a receiving space. The lower clamp of the clamp assembly has a side provided with a mounting space. The clamping unit further includes a clamping space defined between the lower clamp and the upper clamp, an upper pressing block mounted on the receiving space of the upper clamp, a lower pressing block pivotally mounted on the mounting space of the lower clamp, a threaded rod having a lower end secured on the lower pressing block and an upper end extending through the lower clamp, the upper clamp and the upper pressing block, and a locking nut screwed onto the upper end of the threaded rod and pressing the upper pressing block.

The primary objective of the present invention is to provide a musical instrument stand with an angle adjustment function.

According to the primary advantage of the present invention, the mounting seat of the clamping unit is pivotally connected with the universal connector of the support unit so that the support unit can be pivoted relative to the clamping unit so as to adjust the angle of the support unit freely and variably.

According to another advantage of the present invention, a user only needs to rotate the positioning nut of the clamping unit to adjust the angle of the support unit so that the angle of the support unit can be adjusted easily and quickly.

Further benefits and advantages of the present invention will become apparent after a careful reading of the detailed description with appropriate reference to the accompanying drawings.

DETAILED DESCRIPTION OF THE INVENTION

Figure 1:
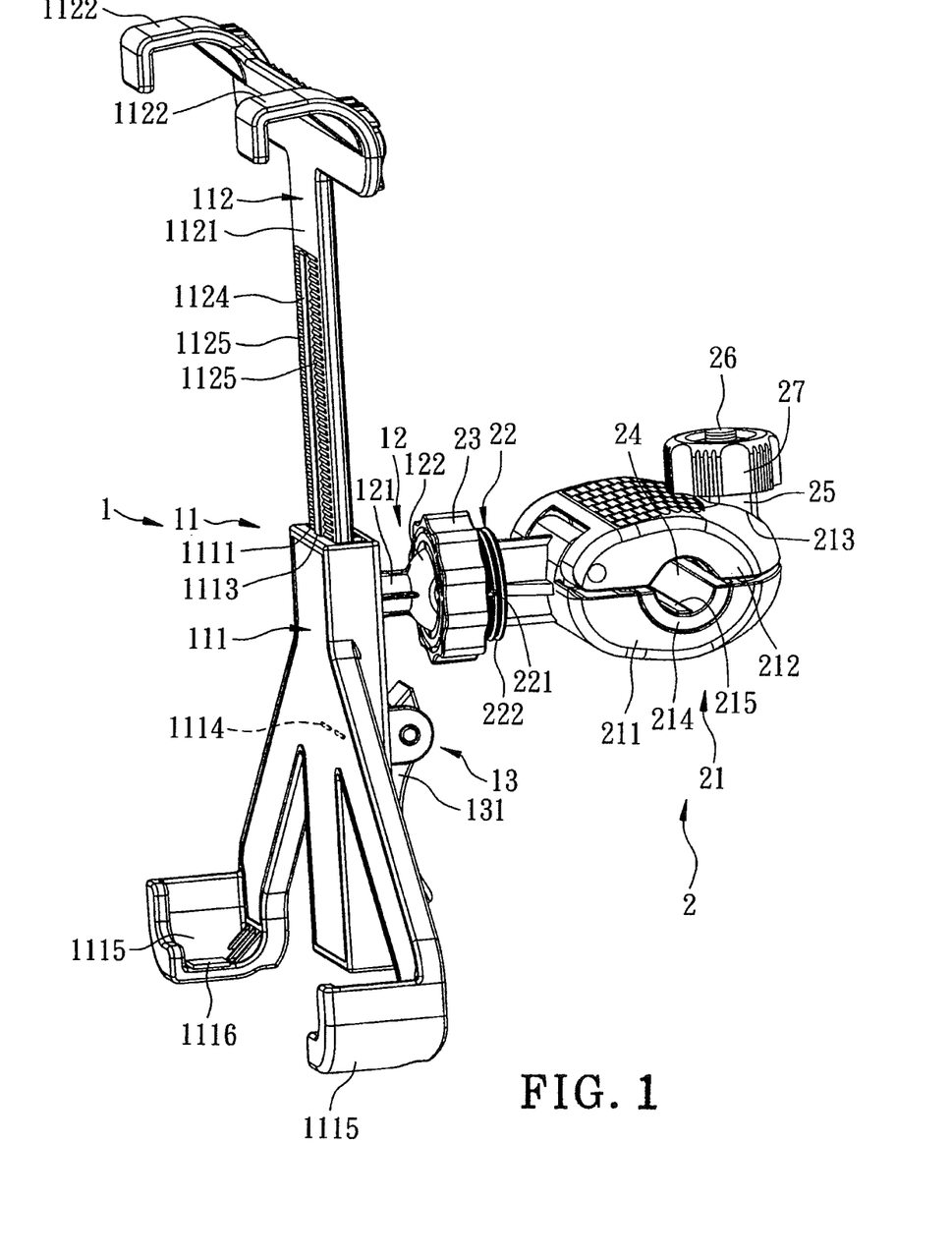
FIG. 1 is a perspective view of a musical instrument stand in accordance with the first preferred embodiment of the present invention.

Referring to the drawings and initially to FIG. 1, a musical instrument stand in accordance with the first preferred embodiment of the present invention comprises a clamping unit 2 and a support unit 1 connected with the clamping unit 2.

Figure 8:
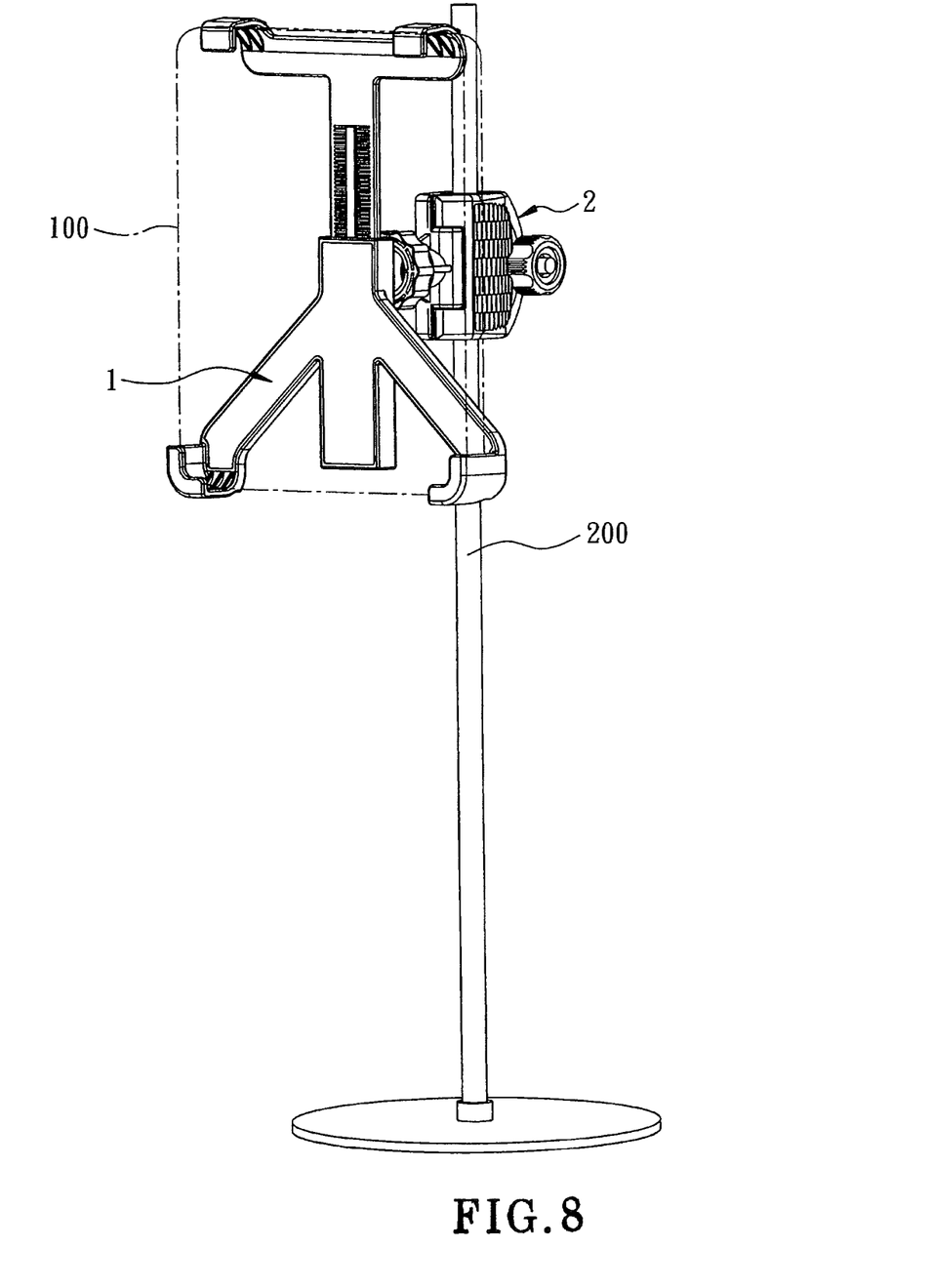
FIG. 8 is a schematic operational view of the musical instrument stand as shown in FIG. 1 in use.

Referring to FIG. 8, the clamping unit 2 is mounted on an upright tube 200, and the support unit 1 is used to support an object, such as a music notation, a musical instrument, a tablet PC (personal computer) 100 and the like.

Figure 5:
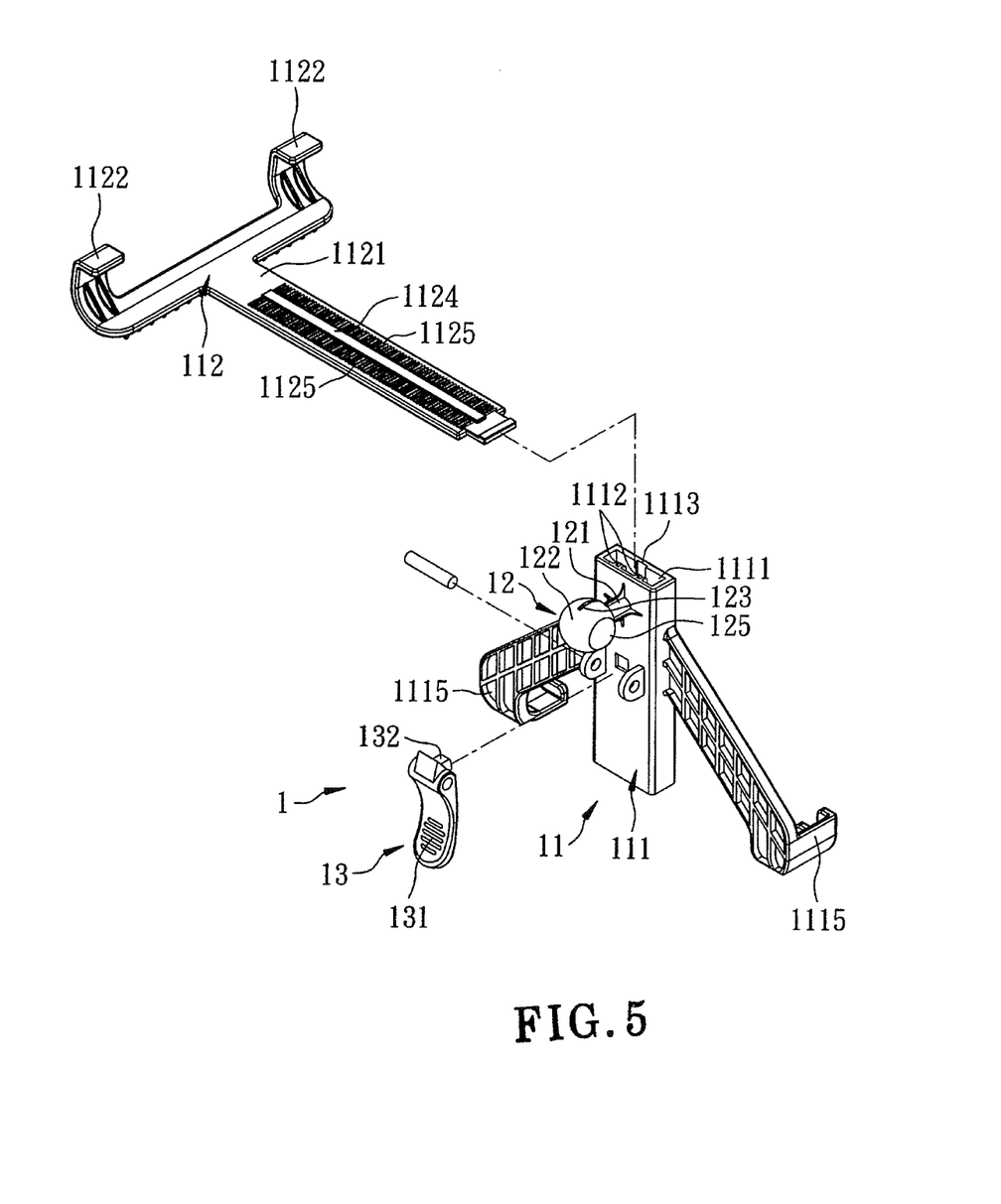
FIG. 5 is a partially exploded perspective view of the musical instrument stand as shown in FIG. 1.
Figure 6:
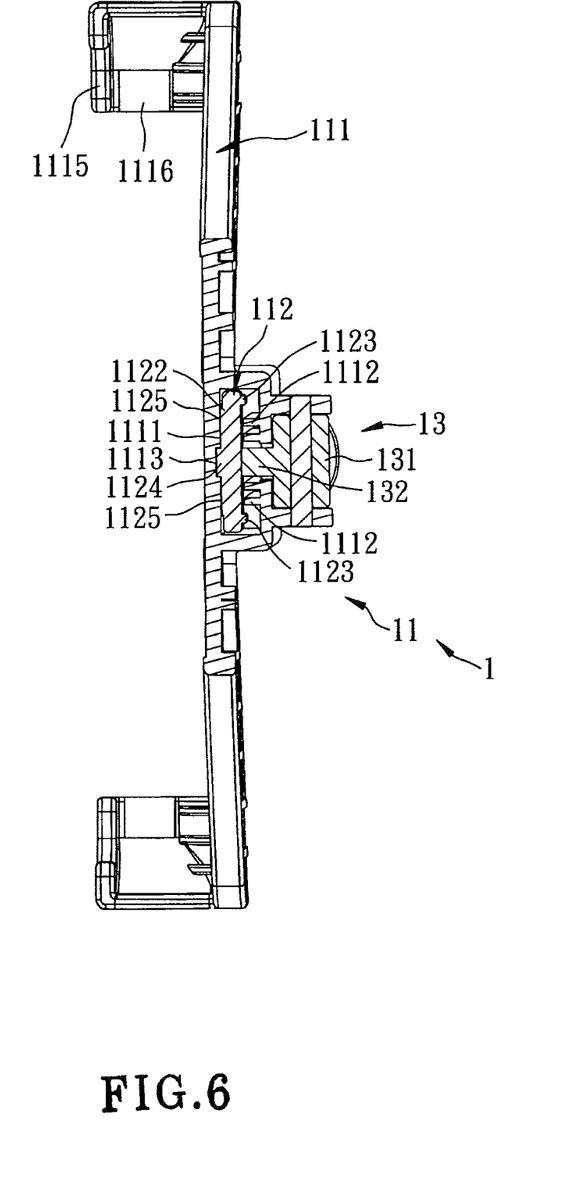
FIG. 6 is a top cross-sectional view of the musical instrument stand as shown in FIG. 1.

Referring to FIGS. 1 and 5, the support unit 1 includes a telescopically arranged base frame 11, a connecting module 12 mounted on a back face of the base frame 11, and a fixing member 13 pivotally mounted on the base frame 11.

Referring to FIGS. 1 and 5-7, the base frame 11 includes a lower support bracket 111 for mounting the connecting module 12 and an upper support bracket 112 inserted into the lower support bracket 111.

The lower support bracket 111 has an interior provided with a slot 1111 to allow insertion of the upper support bracket 112. The slot 1111 of the lower support bracket 111 is disposed at a vertical state and has a front face provided with a guide channel 1113 and a plurality of transverse fixing teeth 1114 and a rear face provided with two inner limit ribs 1112 which are parallel with each other. The fixing teeth 1114 of the lower support bracket 111 are located adjacent to the guide channel 1113. The lower support bracket 111 has an exterior provided with two lower snap-fit portions 1115 and two antiskid pieces 1116. The two antiskid pieces 1116 of the lower support bracket 111 are mounted in the two lower snap-fit portions 1115 respectively.

Each of the two inner limit ribs 1112 of the lower support bracket 111 has a substantially U-shaped cross-sectional profile. The fixing teeth 1114 of the lower support bracket 111 are aligned with the fixing member 13. The two antiskid pieces 1116 of the lower support bracket 111 provide an antiskid effect to the support unit 1.

The upper support bracket 112 includes a shank 1121 inserted into the slot 1111 of the lower support bracket 111, two upper snap-fit portions 1122 connected with an upper end of the shank 1121, a guide rail 1124 mounted on a front face of the shank 1121 and slideable in the guide channel 1113 of the lower support bracket 111, two toothed racks 1125 mounted on the front face of the shank 1121 and releasably engaged with the fixing teeth 1114 of the lower support bracket 111, and two outer limit ribs 1123 mounted on a rear face of the shank 1121 and aligned with the two inner limit ribs 1112 of the lower support bracket 111 respectively. The guide rail 1124 of the upper support bracket 112 is located between the two toothed racks 1125, and the two outer limit ribs 1123 of the upper support bracket 112 are disposed outside of the two inner limit ribs 1112 of the lower support bracket 111.

The fixing member 13 pivotally mounted on the lower support bracket 111 of the base frame 11. The fixing member 13 has a first end provided with a drive portion 131 and a second end provided with a cam portion 132. The cam portion 132 of the fixing member 13 is aligned with the fixing teeth 1114 of the lower support bracket 111. The cam portion 132 of the fixing member 13 extends through the lower support bracket 111 of the base frame 11 and presses the shank 1121 of the upper support bracket 112.

In practice, when the drive portion 131 of the fixing member 13 is driven downward, the cam portion 132 of the fixing member 13 is tightened, so that the support unit 1 is disposed at a locked state. At this time, the cam portion 132 of the fixing member 13 is moved to press to the shank 1121 of the upper support bracket 112 and to push the two toothed racks 1125 of the upper support bracket 112 toward the fixing teeth 1114 of the lower support bracket 111 so that the two toothed racks 1125 of the upper support bracket 112 engage the fixing teeth 1114 of the lower support bracket 111 so as to lock the upper support bracket 112 onto the lower support bracket 111. On the contrary, when the drive portion 131 of the fixing member 13 is driven upward, the cam portion 132 of the fixing member 13 is released, so that the support unit 1 is disposed at an unlocked state. At this time, the cam portion 132 of the fixing member 13 is moved to release to the shank 1121 of the upper support bracket 112 and to disengage the two toothed racks 1125 of the upper support bracket 112 from the fixing teeth 1114 of the lower support bracket 111 so that the two toothed racks 1125 of the upper support bracket 112 are detached from the fixing teeth 1114 of the lower support bracket 111 so as to unlock the upper support bracket 112 from the lower support bracket 111. In such a manner, the upper support bracket 112 can be moved relative to the lower support bracket 111 to adjust the distance between the two upper snap-fit portions 1122 of the upper support bracket 112 and the two lower snap-fit portions 1115 of the lower support bracket 111 so as to support objects of different sizes.

Figure 2:
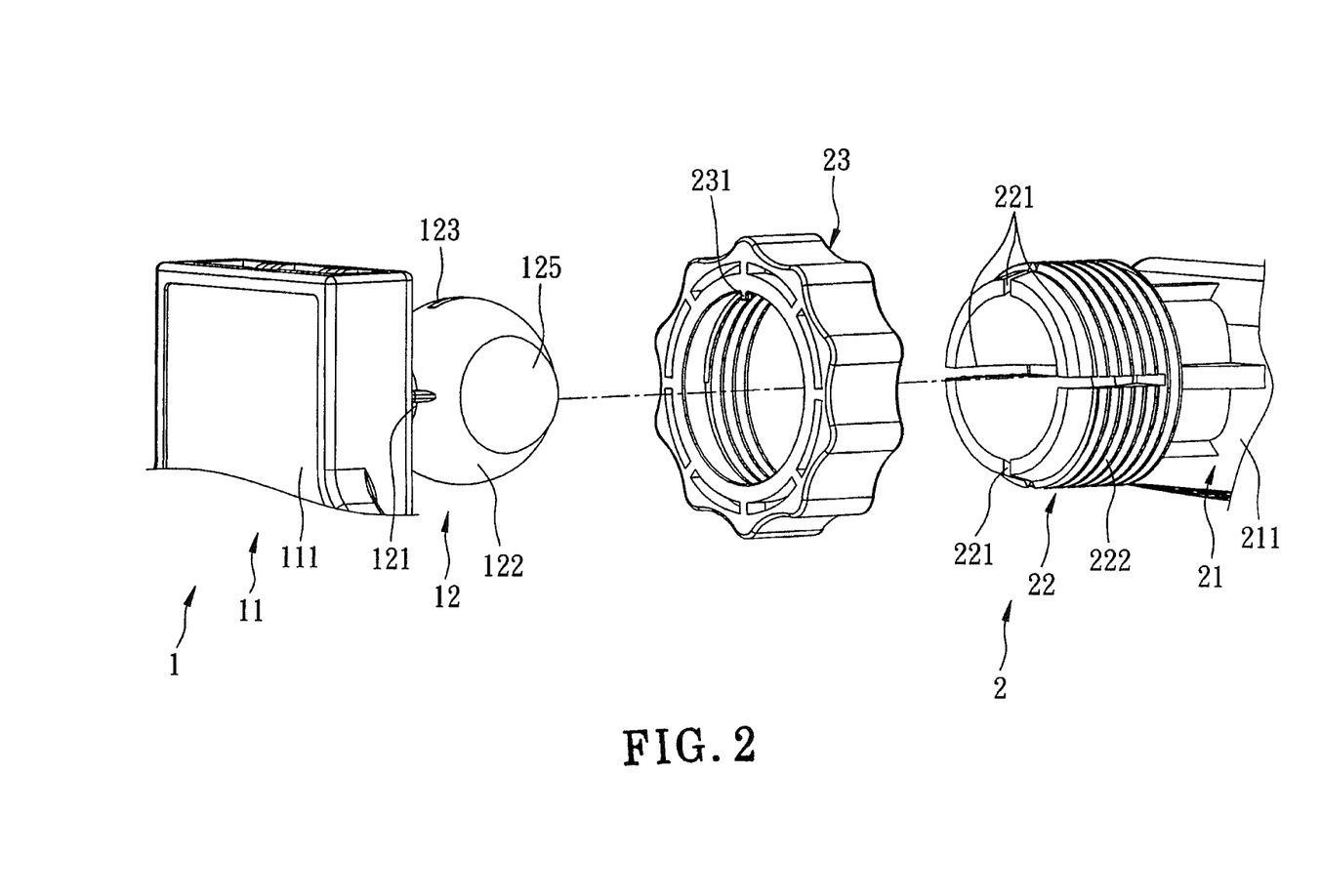
FIG. 2 is a partially exploded perspective view of the musical instrument stand as shown in FIG. 1.
Figure 3:
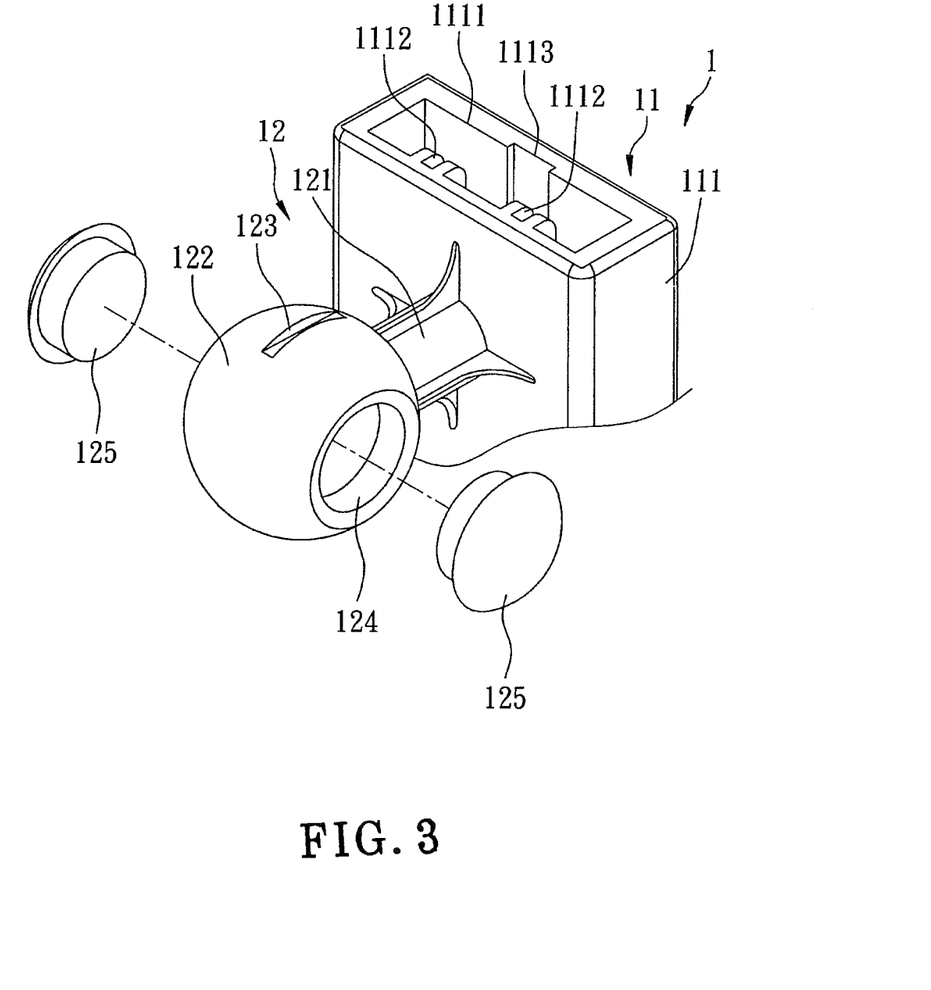
FIG. 3 is a partially exploded perspective view of the musical instrument stand as shown in FIG. 1.

Referring to FIGS. 1-3, the connecting module 12 of the support unit 1 is connected with the clamping unit 2. The connecting module 12 of the support unit 1 includes a connecting portion 121 having a first end connected with the lower support bracket 111 of the base frame 11, a spherical universal connector 122 integrally formed on a second end of the connecting portion 121, and two opposite antiskid blocks 125 mounted on the universal connector 122. The universal connector 122 of the connecting module 12 has a surface provided with a limit groove 123 and has two opposite sides each provided with a mounting recess 124 for mounting each of the two antiskid blocks 125.

Figure 4:
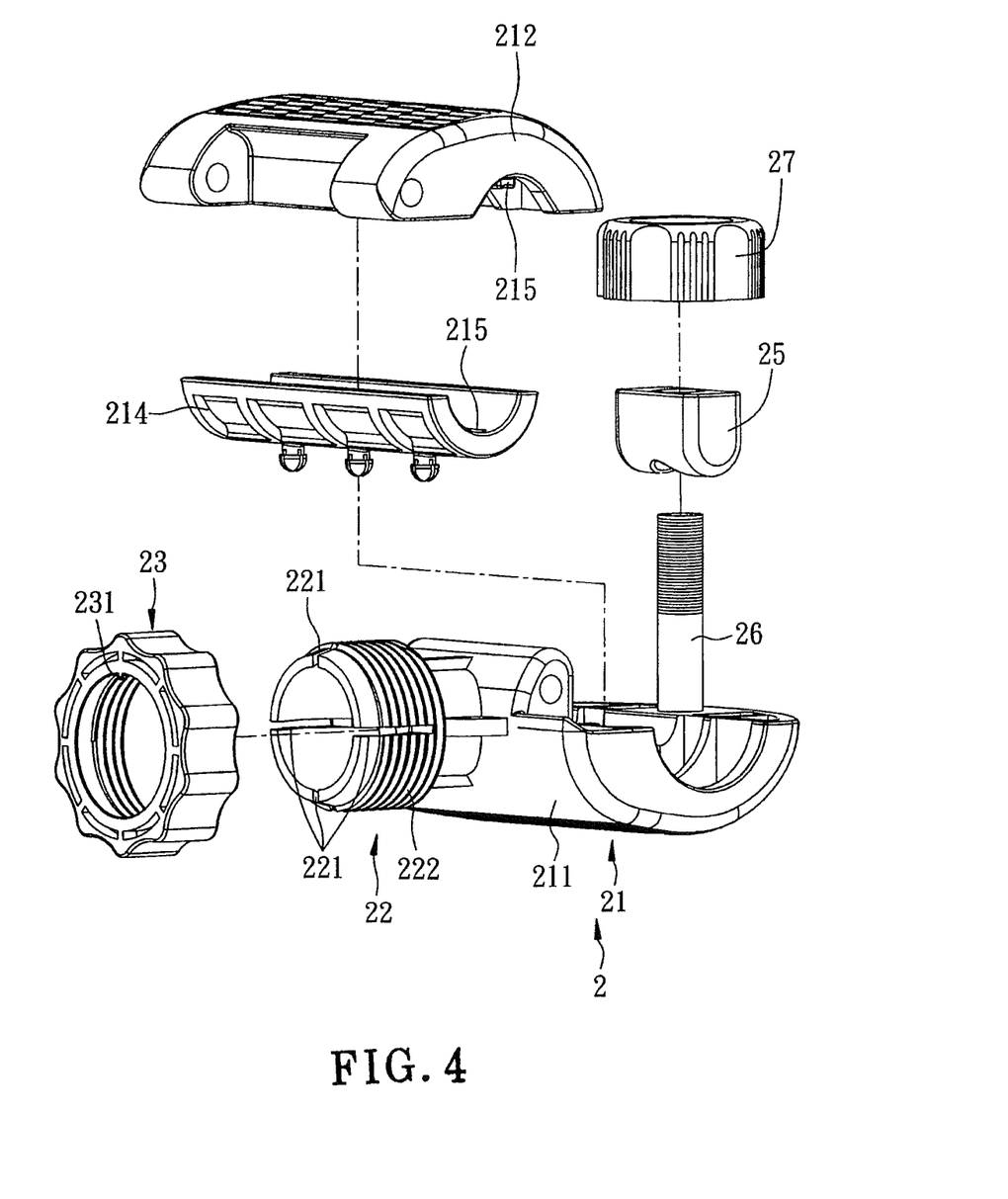
FIG. 4 is a partially exploded perspective view of the musical instrument stand as shown in FIG. 1.

Referring to FIGS. 1, 2 and 4, the clamping unit 2 includes a clamp assembly 21, a spherical mounting seat 22 connected with the clamp assembly 21 and pivotally connected with the universal connector 122 of the connecting module 12, and a positioning nut 23 screwed onto the mounting seat 22.

The clamp assembly 21 includes a lower clamp 211 connected with the mounting seat 22, an upper clamp 212 connected with and movable relative to the lower clamp 211, a bushing 214 removably mounted in the lower clamp 211 and disposed between the lower clamp 211 and the upper clamp 212, and two antiskid members 215 mounted in the upper clamp 212 and the bushing 214 respectively. The upper clamp 212 has a surface provided with a receiving space 213. In the first preferred embodiment of the present invention, each of the two antiskid members 215 is a protruding bar, and the thickness of the bushing 214 is variable.

The clamping unit 2 further includes a clamping space 24 defined between the bushing 214 and the upper clamp 212, an upper pressing block 25 mounted on the receiving space 213 of the upper clamp 212, a threaded rod 26 having a lower end secured on the lower clamp 211 and an upper end extending through the upper clamp 212 and the upper pressing block 25, and a locking nut 27 screwed onto the upper end of the threaded rod 26 and pressing the upper pressing block 25.

The mounting seat 22 has a first end connected with the lower clamp 211 of the clamp assembly 21 and a second end provided with an external thread 222 onto which the positioning nut 23 is screwed onto. The second end of the mounting seat 22 has a periphery provided with at least two elongate slits 221. In the preferred embodiment of the present invention, the mounting seat 22 has four slits 221. The positioning nut 23 has an inner wall provided with a limit piece 231 limited in the limit groove 123 of the universal connector 122. Thus, when the positioning nut 23 is mounted on the connecting portion 121 of the connecting module 12, the limit piece 231 of the positioning nut 23 is limited in the limit groove 123 of the universal connector 122 so that the positioning nut 23 is limited on and will not be detached from the connecting portion 121 of the connecting module 12.

Referring to FIGS. 1 and 2, when the support unit 1 and the clamping unit 2 are disposed at an unlocked state, the base frame 11 of the support unit 1 is detached from the clamp assembly 21 of the clamping unit 2, and the positioning nut 23 of the clamping unit 2 is mounted on the connecting portion 121 of the connecting module 12.

Figure 7:
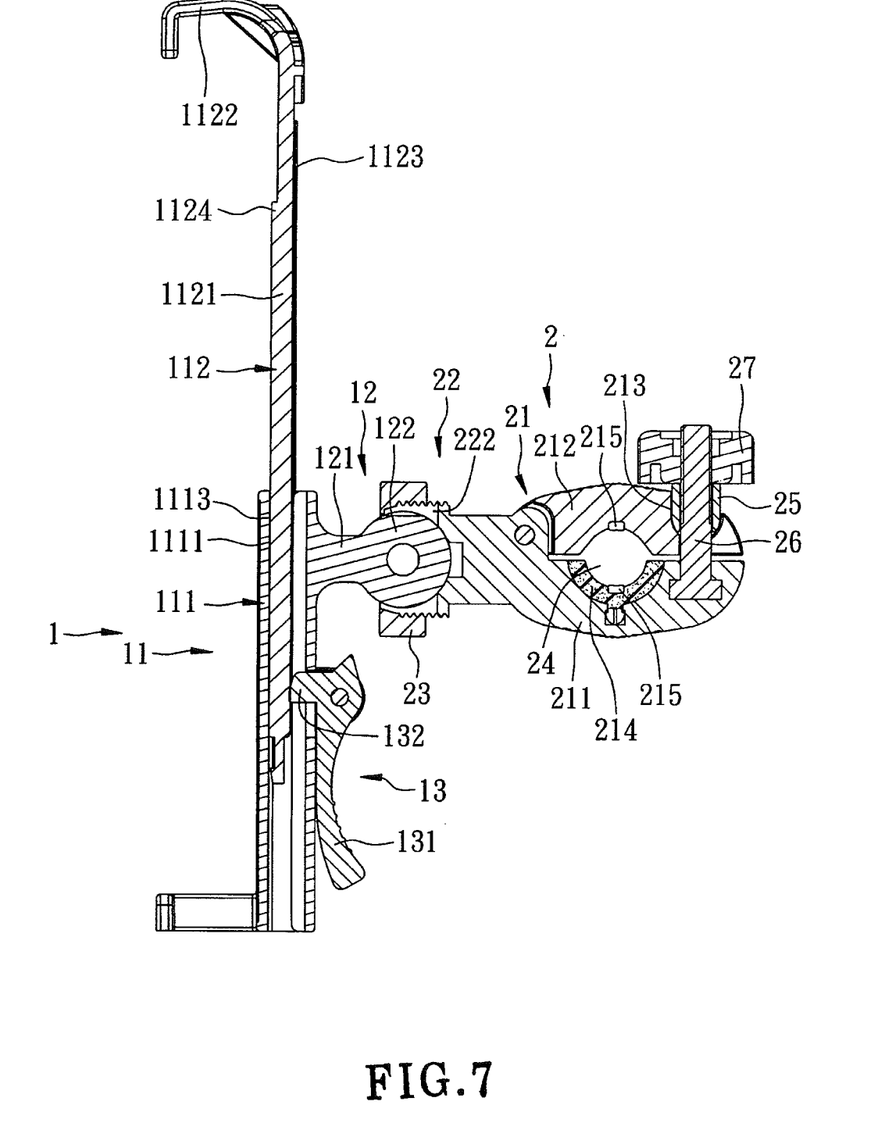
FIG. 7 is a side cross-sectional view of the musical instrument stand as shown in FIG. 1.

Referring to FIGS. 1 and 7, when the support unit 1 and the clamping unit 2 are disposed at a locked state, the mounting seat 22 of the clamping unit 2 is mounted on the universal connector 122 of the support unit 1, and the positioning nut 23 of the clamping unit 2 is screwed onto the external thread 222 of the mounting seat 22 to compress the slits 221 of the mounting seat 22 and to contract the mounting seat 22 so that the mounting seat 22 compresses the universal connector 122 closely. At this time, the mounting seat 22 and the universal connector 122 are positioned solidly and stably by the two antiskid blocks 125 on the universal connector 122. Thus, when the positioning nut 23 of the clamping unit 2 is unscrewed from the external thread 222 of the mounting seat 22, the universal connector 122 is unlocked from the mounting seat 22 so that the support unit 1 is released from and can be pivoted relative to the clamping unit 2 so as to adjust the angle of the support unit 1 and to adjust the angular position of the tablet PC 100.

Figure 9:
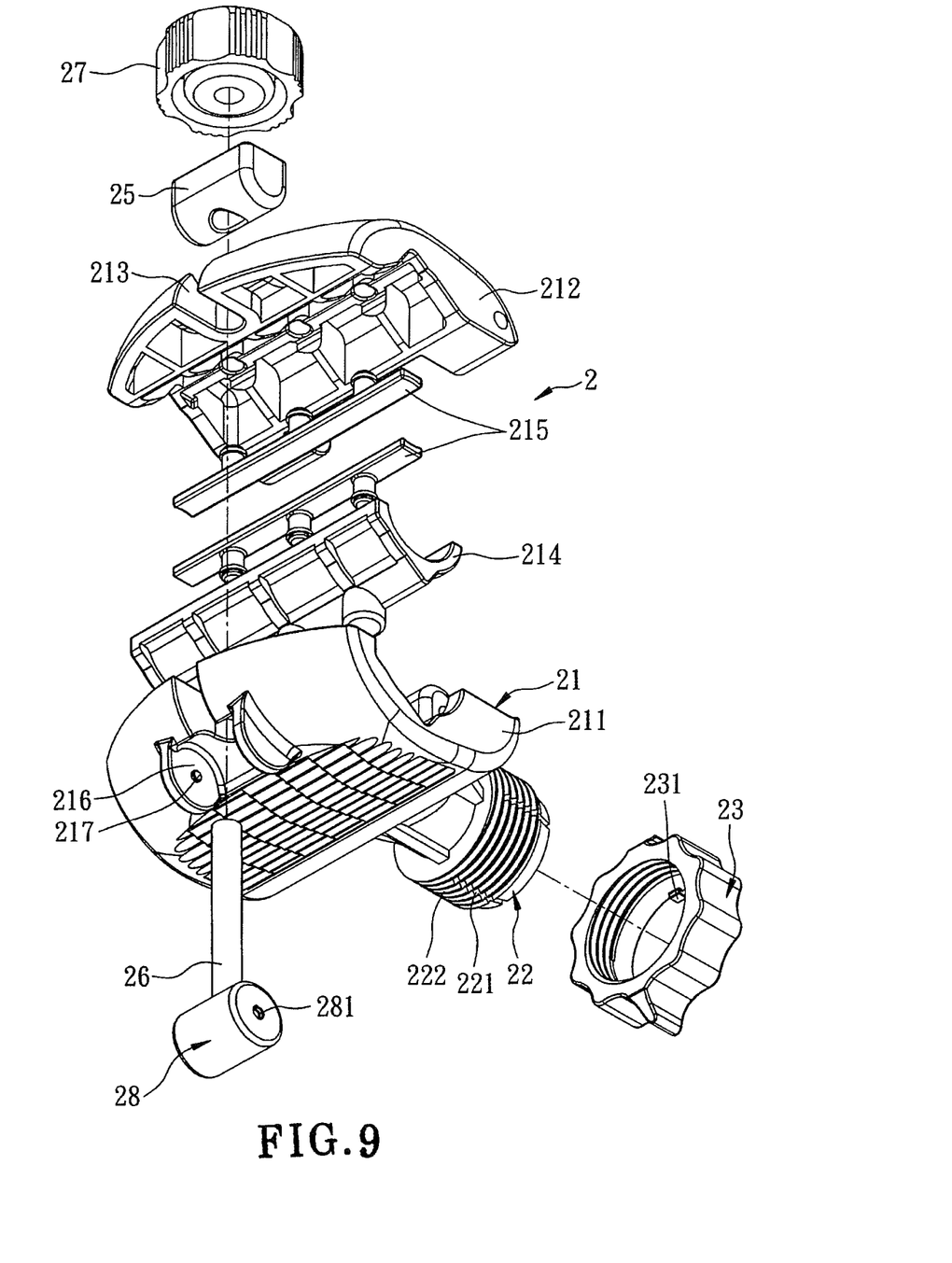
FIG. 9 is a partially exploded perspective view of a musical instrument stand in accordance with the second preferred embodiment of the present invention.
Figure 10:
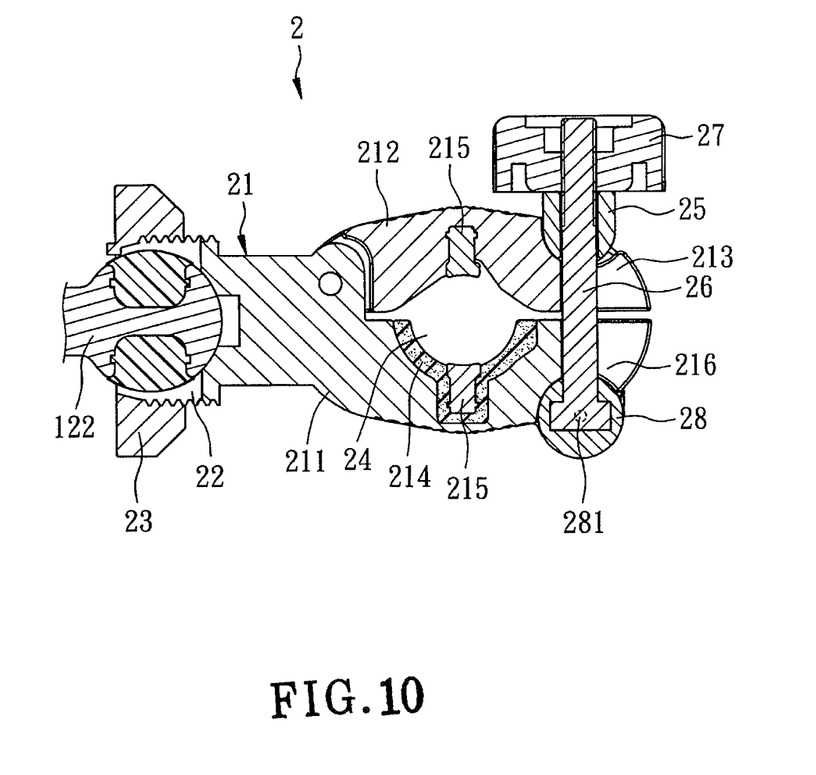
FIG. 10 is a side cross-sectional assembly view of the musical instrument stand as shown in FIG. 9.
Figure 11:
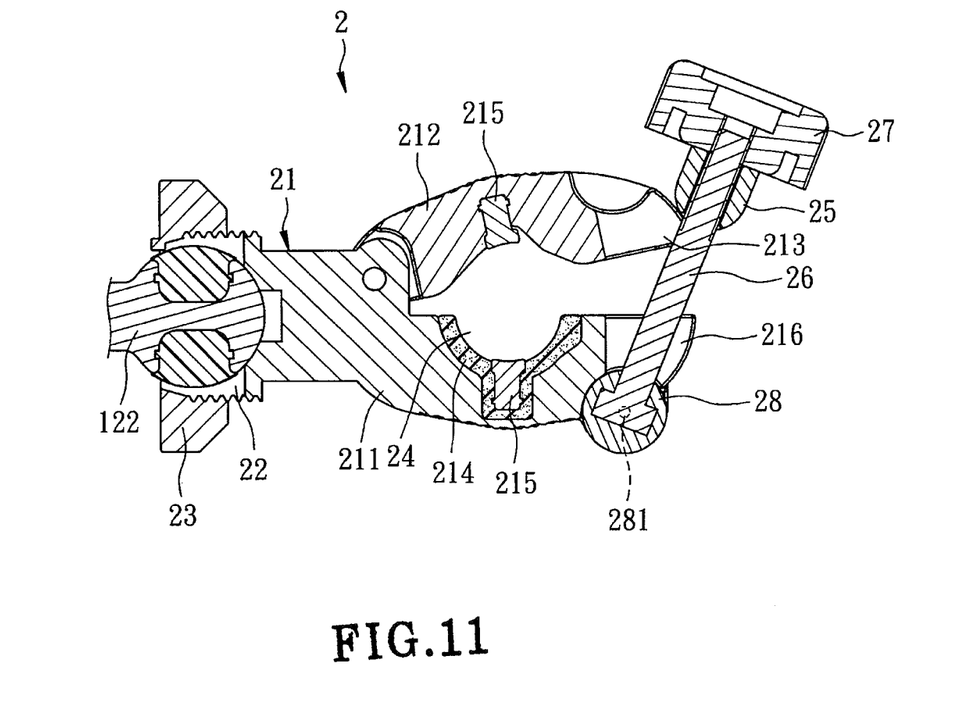
FIG. 11 is a schematic operational view of the musical instrument stand as shown in FIG. 10.

Referring to FIGS. 9-11, in the second preferred embodiment of the present invention, the clamp assembly 21 includes a lower clamp 211 connected with the mounting seat 22, an upper clamp 212 connected with and movable relative to the lower clamp 211, a bushing 214 removably mounted in the lower clamp 211 and disposed between the lower clamp 211 and the upper clamp 212, and two antiskid members 215 mounted in the upper clamp 212 and the bushing 214 respectively. The upper clamp 212 has a surface provided with a receiving space 213. The lower clamp 211 of the clamp assembly 21 has a side provided with a mounting space 216. The mounting space 216 of the lower clamp 211 has two opposite pivot holes 217. The clamping unit 2 further includes a clamping space 24 defined between the bushing 214 and the upper clamp 212, an upper pressing block 25 mounted on the receiving space 213 of the upper clamp 212, a lower pressing block 28 pivotally mounted on the mounting space 216 of the lower clamp 211, a threaded rod 26 having a lower end secured on the lower pressing block 28 and an upper end extending through the lower clamp 211, the upper clamp 212 and the upper pressing block 25, and a locking nut 27 screwed onto the upper end of the threaded rod 26 and pressing the upper pressing block 25. The lower pressing block 28 has two opposite pivot bosses 281 pivotally mounted in the two pivot holes 217 of the lower clamp 211 respectively. Preferably, the receiving space 213 of the upper clamp 212 is extended through and connected to a side rim of the upper clamp 212, and the mounting space 216 of the lower clamp 211 is extended through and connected to a side rim of the lower clamp 211.

Referring to FIG. 10, when the clamping unit 2 is disposed at a locked state, the locking nut 27 is screwed onto the threaded rod 26 tightly to press the upper pressing block 25 toward the upper clamp 212 and to press the lower pressing block 28 toward the lower clamp 211 so that the upper clamp 212 and the lower clamp 211 are moved toward each other to clamp an object closely.

Referring to FIG. 11, when the clamping unit 2 is disposed at an unlocked state, the locking nut 27 is unscrewed from the threaded rod 26 tightly to release the upper pressing block 25 and the lower pressing block 28 toward the lower clamp 211 so that the upper clamp 212 and the lower clamp 211 are released to loosen the object. In such a manner, when the threaded rod 26 is moved, the lower pressing block 28 is driven by the threaded rod 26 to pivot relative to the lower clamp 211 with each of the two pivot bosses 281 of the lower pressing block 28 functioning as a fulcrum so that the upper pressing block 25 is also driven by the threaded rod 26 to move outward relative to the upper clamp 212. At this time, the receiving space 213 of the upper clamp 212 is extended through and connected to a side rim of the upper clamp 212, and the mounting space 216 of the lower clamp 211 is extended through and connected to a side rim of the lower clamp 211 so that the threaded rod 26 can be moved to detach from the receiving space 213 of the upper clamp 212 and the mounting space 216 of the lower clamp 211, and the upper pressing block 25 is moved with the threaded rod 26 to detach from the upper clamp 212. Thus, the upper clamp 212 can be pivoted outward relative to the lower clamp 211 to open the clamping space 24 of the clamping unit 2.

Accordingly, the mounting seat 22 of the clamping unit 2 is pivotally connected with the universal connector 122 of the support unit 1 so that the support unit 1 can be pivoted relative to the clamping unit 2 so as to adjust the angle of the support unit 1 freely and variably. In addition, a user only needs to rotate the positioning nut 23 of the clamping unit 2 to adjust the angle of the support unit 1 so that the angle of the support unit 1 can be adjusted easily and quickly.

Although the invention has been explained in relation to its preferred embodiment(s) as mentioned above, it is to be understood that many other possible modifications and variations can be made without departing from the scope of the present invention. It is, therefore, contemplated that the appended claim or claims will cover such modifications and variations that fall within the true scope of the invention.

The invention claimed is:

1. A musical instrument stand, comprising:
  a clamping unit; and
  a support unit connected with the clamping unit;
  wherein the support unit includes a telescopically arranged base frame, and a connecting module mounted on a face of the base frame;
  the connecting module of the support unit is connected with the clamping unit;
  the connecting module of the support unit includes a connecting portion having a first end connected with the base frame, and a spherical universal connector integrally formed on a second end of the connecting portion;
  the clamping unit includes a clamp assembly, a spherical mounting seat connected with the clamp assembly and pivotally connected with the universal connector of the connecting module, and a positioning nut screwed onto the mounting seat;

the mounting seat has a first end connected with the clamp assembly and a second end provided with an external thread onto which the positioning nut is screwed onto;

the second end of the mounting seat has a periphery provided with at least two elongate slits;

when the support unit and the clamping unit are disposed at an unlocked state, the base frame of the support unit is detached from the clamp assembly of the clamping unit, and the positioning nut of the clamping unit is mounted on the connecting portion of the connecting module;

when the support unit and the clamping unit are disposed at a locked state, the mounting seat of the clamping unit is mounted on the universal connector of the support unit, and the positioning nut of the clamping unit is screwed onto the external thread of the mounting seat to compress the slits of the mounting seat and to contract the mounting seat so that the mounting seat compresses the universal connector closely.

2. The musical instrument stand of claim 1, wherein the universal connector of the connecting module has a surface provided with a limit groove;

the positioning nut has an inner wall provided with a limit piece limited in the limit groove of the universal connector.

3. The musical instrument stand of claim 1, wherein the connecting module of the support unit further includes two opposite antiskid blocks mounted on the universal connector;

the universal connector of the connecting module has two opposite sides each provided with a mounting recess for mounting each of the two antiskid blocks.

4. The musical instrument stand of claim 1, wherein the clamp assembly includes a lower clamp connected with the mounting seat, and an upper clamp connected with and movable relative to the lower clamp;

the upper clamp has a surface provided with a receiving space;

the clamping unit further includes a clamping space defined between the lower clamp and the upper clamp, an upper pressing block mounted on the receiving space of the upper clamp, a threaded rod having a lower end secured on the lower clamp and an upper end extending through the upper clamp and the upper pressing block, and a locking nut screwed onto the upper end of the threaded rod and pressing the upper pressing block.

5. The musical instrument stand of claim 4, wherein the clamp assembly further includes a bushing removably mounted in the lower clamp and disposed between the lower clamp and the upper clamp;

the clamping space of the clamping unit is defined between the bushing and the upper clamp.

6. The musical instrument stand of claim 5, wherein the clamp assembly further includes two antiskid members mounted in the upper clamp and the bushing respectively.

7. The musical instrument stand of claim 6, wherein each of the two antiskid members is a protruding bar.

8. The musical instrument stand of claim 1, wherein the clamp assembly includes a lower clamp connected with the mounting seat, and an upper clamp connected with and movable relative to the lower clamp;

the upper clamp has a surface provided with a receiving space;

the lower clamp of the clamp assembly has a side provided with a mounting space;

the clamping unit further includes a clamping space defined between the lower clamp and the upper clamp, an upper pressing block mounted on the receiving space of the upper clamp, a lower pressing block pivotally mounted on the mounting space of the lower clamp, a threaded rod having a lower end secured on the lower pressing block and an upper end extending through the lower clamp, the upper clamp and the upper pressing block, and a locking nut screwed onto the upper end of the threaded rod and pressing the upper pressing block.

9. The musical instrument stand of claim 8, wherein the receiving space of the upper clamp is extended through and connected to a side rim of the upper clamp; and the mounting space of the lower clamp is extended through and connected to a side rim of the lower clamp.

* * * * *